United States Patent [19]

Bixby

[11] 4,169,174
[45] Sep. 25, 1979

[54] FLEXIBLE MANDREL LUBRICATION

[75] Inventor: Guy T. Bixby, Longmont, Colo.

[73] Assignee: The Gates Rubber Company, Denver, Colo.

[21] Appl. No.: 970,095

[22] Filed: Dec. 15, 1978

[51] Int. Cl.² ........................ B05D 3/00; B05D 3/12; B05D 1/18
[52] U.S. Cl. ........................ 427/353; 72/41; 72/43; 72/44; 72/45; 118/125; 118/304; 118/420; 118/DIG. 18; 118/DIG. 19; 427/358; 427/430 R
[58] Field of Search ........................ 72/41, 43, 44, 45; 427/358, 348, 352, 430 R, 353; 118/125, 304, 420, DIG. 18, DIG. 19

[56] References Cited

U.S. PATENT DOCUMENTS 3,692,678  9/1972  Stiffler ........................ 252/56 X Primary Examiner—Michael R. Lusignan
Attorney, Agent, or Firm—Curtis H. Castleman, Jr.; Raymond Fink; H. W. Oberg, Jr.

[57] ABSTRACT

Flexible core such as rubber rod useful as an internal mandrel in the construction of tubular articles, such as hose, is coated with a liquid lubricant substantially undiluted with solvent, and excess lubricant is removed using high pressure liquid spray jets impacting the core angularly and countercurrent to the direction of movement of the mandrel.

8 Claims, 4 Drawing Figures

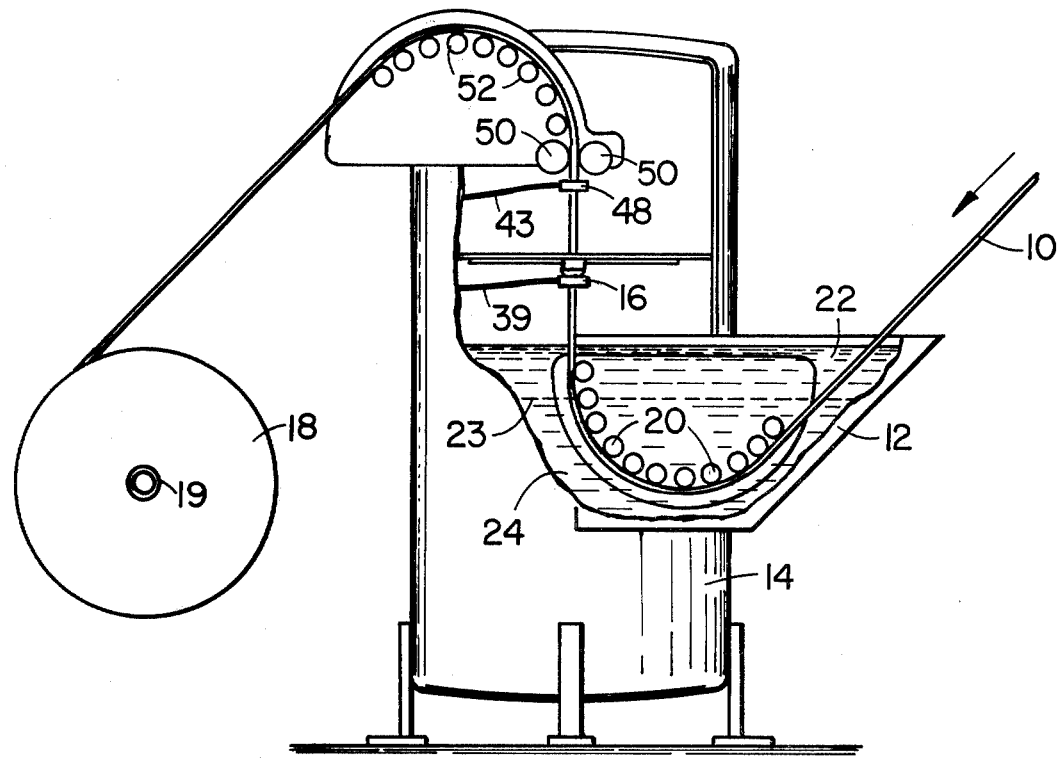
FIG. 1
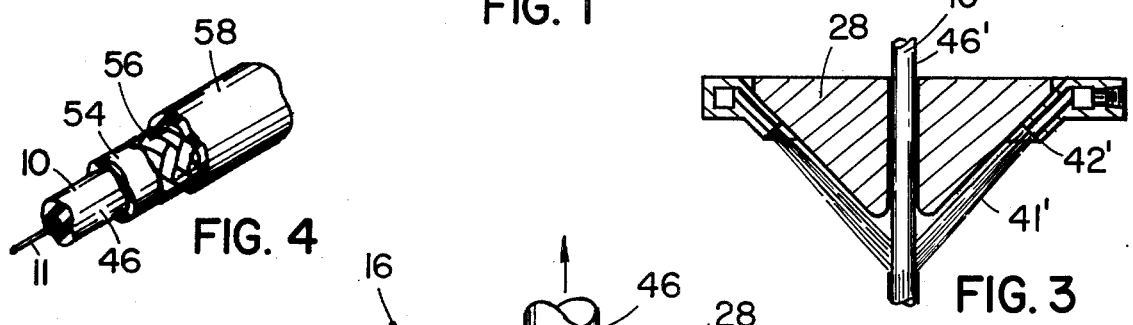
FIG. 4
FIG. 3
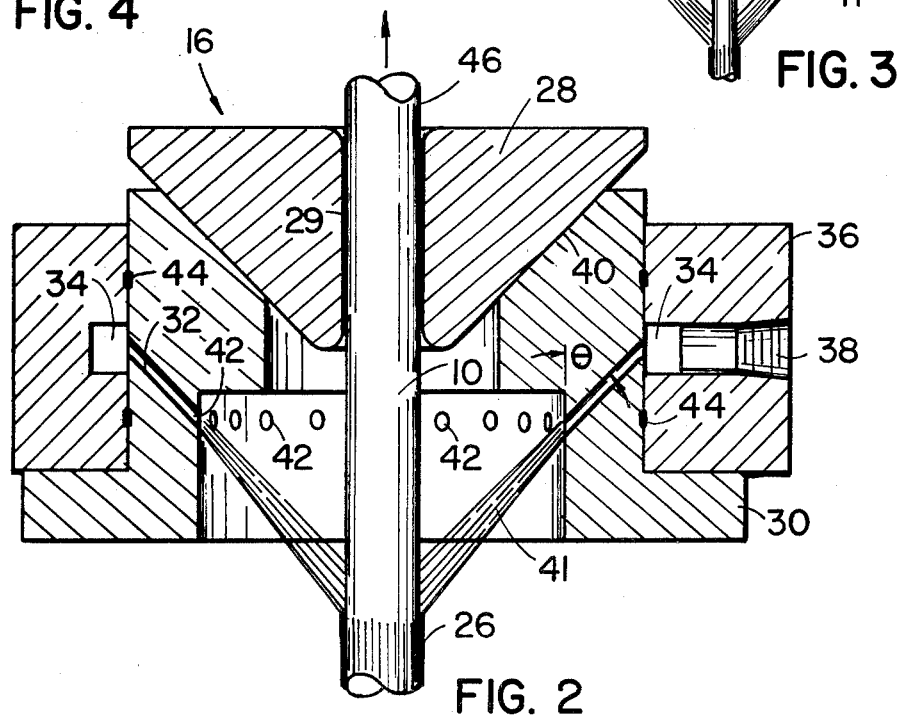
FIG. 2

FLEXIBLE MANDREL LUBRICATION

BACKGROUND OF THE INVENTION

This invention relates to method and apparatus for applying liquid lubricant to the surface of flexible cores or the like, particularly as a preliminary step in the production of flexible tubular articles.

In the manufacture of long lengths of small diameter hose, a pre-cured flexible rubber rod, known as a mandrel, is used as a core on which the hose is constructed and cured. In the case of rubber hose, curing is effected by vulcanization. Most plastic hose, on the other hand, becomes cured or heat set immediately upon extrusion at room temperature. In either case, upon curing the hose, the mandrel, which may be as long as 1200 feet or more, must be removed from the hose and this is normally done using high pressure water. In addition, to prevent sticking of the mandrel to the interior tube of the hose a release agent (lubricant) is applied to the surface of the mandrel. A graphite mixture has traditionally been used as a release agent, however residual graphite left in the tube of the hose must be removed by a washing step to meet hose cleanliness requirements.

Silicone oil and other clean fluids have been used as lubricant substitutes for graphite. The silicone is customarily applied by passing the mandrel through a tank containing a silicone thinned with a solvent, and then guiding the mandrel through a wiper. However, this system is beset with critical drawbacks. It is extremely difficult to apply a uniformly thin coating of the silicone on the mandrel surface. Oftentimes too thin a mixture is applied to all or a portion of the circumference of the mandrel, and this causes sticking leading to difficulty in removal of the mandrel from the cured hose. When the solvent mixture applied is too thick, localized pools of lubricant mixture are created between the mandrel and hose tube, leading to the creation of undesirable pinholes in the hose tube. Moreover, with the silicone/solvent system, solvent vapor emissions introduce vapor control costs, fire hazards and quality control costs not to mention the added cost of the solvent.

It is a primary object of the subject invention to provide a system for lubricating flexible mandrel without the aforementioned problems, wherein a carefully controlled thin coating of lubricant, substantially undiluted by solvent, is applied generally uniformly to the surface of the mandrel, and without requiring significant further processing.

SUMMARY OF THE INVENTION

Briefly described, according to the method of the invention flexible mandrel is lubricated by the steps including (1) applying a coating of liquid lubricant, such as silicone, substantially undiluted by solvent to the surface of the mandrel in excess of the thickness of coating finally desired; (2) removing excess lubricant by impacting the coated mandrel with high pressure spray jet directed angularly to the surface of the coating mandrel, while simultaneously (3) moving the mandrel relative to the spray jet in a direction countercurrent thereto.

The method may be performed by apparatus including a vessel or tank adapted to contain a supply of liquid lubricant, bushing means in the vessel for guiding a flexible core therethrough, a nozzle adjacent the bushing for directing high pressure liquid spray jet angularly against the flexible core mandrel coated with the liquid lubricant, and means for moving the core through the liquid lubricant and thereafter through the bushing in a direction countercurrent to the spray jet.

BRIEF DESCRIPTION OF THE DRAWINGS

Certain preferred embodiments of the invention will be discussed in reference to the accompanying drawings, wherein like numerals designate like parts, and wherein:

FIG. 1 is an elevational view, partially cutaway, depicting apparatus for performing the method of the invention;

FIG. 2 is a detailed sectional view of a bushing and nozzle spray head used in the method of the invention;

FIG. 3 is a view similar to FIG. 2 showing an alternative embodiment; and

FIG. 4 depicts in partial section and partial cutaway a flexible mandrel with a hose positioned thereover.

PREFERRED EMBODIMENTS OF THE INVENTION

Referring first to FIG. 1, in general, incoming flexible mandrel 10 is dipped in inlet trough 12, forming a part of and being in fluid communication with vessel 14, containing a liquid lubricant 22 such as silicone, and then guided through spray head nozzle 16 to remove excess lubricant and finally wound up on takeup spool 18.

The incoming core or mandrel 10 may be formed of any elongate flexible material of any desired cross sectional shape, but most preferably in the manufacture of hose is formed of a pre-cured elastomeric rod of cylindrical shape. Depending on the type and length of hose being constructed, the mandrel may additionally include an axially positioned cable reinforcement 11 or the like, as shown in FIG. 4.

Trough 12, which is in fluid communication with the interior of vessel 14, includes a series of guide rollers 20 about which the incoming mandrel 10 is guided through the dipping solution and thereafter upwards through the nozzle and bushing assembly 16. The dipping solution preferably is a two-component system including the lighter lubricant phase 22 floating on top of (via interface 23) the heavier spray liquid layer 24. In this manner, the incoming mandrel 10, which is uncoated, is dipped initially through the lubricant layer 22 which adheres to the mandrel surface as a relatively thick coating 26 (see FIG. 2) upon upward exit from the dipping solution.

Lubricant liquid 22 may be any desired lubricating liquid although clean liquids such as polyalkylene glycols, various surfactants such as stearates, however, silicone and other lubricating oils are most preferred. The lubricant is substantially undiluted by solvent, unlike prior processes. It is preferred to use pure silicone oil, although the lubricant can be in admixture with other desired, non-solvent materials as required by the particular process. A pure silicone oil marketed under the name DC 200 from Dow Corning has been found to be especially useful for lubricating flexible mandrel for hydraulic hose production. This particular silicone oil maintains a substantially invariant viscosity over a wide operating temperature range.

Referring in more detail to FIGS. 2 and 3, the mandrel carrying lubricant coating 26 in excess of the thickness of the coating finally desired, moves generally vertically into the spray head assembly 16. The assembly consists primarily of a collar-shaped nozzle head 30, an annular body 36 fitted about the nozzle head, and a conical bushing 28 received on the inclined annular surface 40 of the nozzle head. The internal bore 29 of the bushing is provided with a desired clearance relative to the outside diameter of the mandrel guided therethrough, taking into account the lubricant coating thickness. The assembly spray head 16 is designed such that bushing 28 may be interchanged with another bushing of different bore dimension to accommodate the particular diameter mandrel being processed.

The nozzle body 30 is penetrated by a plurality of jets 32 with equally spaced apart orifice openings 42. The jet passageways are canted at an angle $\theta$ relative to the longitudinal axis of the moving mandrel, which will preferably be in the range from about 30° to about 60° and more preferably from about 40 to about 50 degrees. The jets are in fluid communication with annular manifold 34 which in turn receives liquid from conduit 39 connected at threaded opening 38. The annular body 36 and spray head 30 may be fitted together in sealing relationship with the aid of O-rings 44.

As mandrel 10 with its relatively thick coating 26 of lubricant passes into the bottom opening of the spray head nozzle assembly 16, high pressure, turbulent liquid spray jets 41 emanating from orifices 42 uniformly impact the mandrel surface and coating 26, whereby the lubricant coating thickness is reduced substantially. The degree of coating thickness reduction will be determined by the pressure of the spray jet liquid, and the throughput rate of the mandrel. To achieve controlled reduction in coating thickness it has been found necessary to impact the coated mandrel at the aforementioned angle $\theta$, while simultaneously moving the mandrel relative to the spray head assembly in a countercurrent direction to the spray flow, as shown by the arrow. Unexpectedly, it has been found that it is relatively easy to reduce the silicone coat thickness uniformly to a desired thin coat and simultaneously for the high pressure liquid jet to reach through the coating to remove particles of dirt or other contamination lodged on the incoming mandrel. Dirt and particle removal is achieved without disruption of the final, thin lubricant coat.

As the mandrel with the reduced coating thickness passes through the guide bushing 28, there may be additional, although minimal, wiping action depending upon the clearance with the internal bore 29 of the bushing, without deleterious effect. The mandrel finally passes through the bushing with its uniform lubricant coating 46 of desired thickness. However, when the preferred water or other aqueous solution is used as the jet spray liquid, residual water droplets may adhere to the silicone coating. These may be removed with air jet 48 (FIG. 1) supplied from line 43, of any conventional design, functioning to strip the water droplets from the surface of the coated mandrel without disturbing the lubricant coat.

In the alternative embodiment shown in FIG. 3, the jet orifices 42' are positioned immediately adjacent the lower surface of the conical bushing 28. In this manner, the impact of jet 41' is adjacent to the bushing opening, the bushing serving to additionally contain the upward component of the spray. The spray impact angle is thereby more carefully controlled than in the embodiment of FIG. 2.

Upon exiting the air jet bushing 48, the mandrel with its desired thin coating of lubricant is guided through a pair of contoured guide rollers 50 and over a series of conveyor rollers 52, and then taken up on reel 18. Either the conveyor rollers 52 or reel 18, about its axis 19, may be driven at the throughput rate calculated to reduce the coating thickness of the lubricant to the required level. Generally, it is preferred to maintain the jet spray at constant velocity (i.e., constant pressure) and then vary the speed of the mandrel to fit the specification requirement. The pressure is preferably maintained from at least about 300 psi, more preferably from about 500 to about 700 psi. It will be appreciated that the vessel 14 and trough 12 may be provided with appropriate baffles to ensure that the liquid spray 41 does not intermix significantly with the inlet portion of trough 12 where the mandrel should be dipped in lubricant uncontaminated with the jetting fluid. Also, it is preferred to employ a filter system (not shown) for continuously cleaning the lubricant in the tank, and appropriate lines may be provided for returning excess lubricant to the tank where it floats on top at 22. This allows drawing the lubricant oil from the top of the liquid in the tank, and spray water from the bottom.

In a specific application for the treatment of ½ inch diameter mandrel useful in the production of hydraulic hose, pure silicone oil is used as a lubricant, and tap water employed as the liquid spray jet material. The jets 32 are oriented at an angle $\theta$ equal to 45 degrees. The throughput rate of the mandrel is about 200 feet/minute and the water jet is delivered through twenty equally circumferentially spaced orifices at a pressure of about 600 psi. The original silicone coating 26 has a thickness from about 0.015 to about 0.045 inches, which after exit from the spray head nozzle is reduced in thickness (at 46) to a final thickness of from about 0.0003 to about 0.0007 inches. The bushing internal diameter 29 is greater than the mandrel outer diameter by 0.040 inches producing a centered side clearance of about 0.020 inches relative to the mandrel. In general, in hose production the silicone film thickness should be kept preferably less than about 0.001 inches to prevent creation of pinholes during later curing of the hose on the flexible mandrel.

The coated mandrel may then be employed for the building and curing of the hose article shown in FIG. 4. In this case, mandrel 10 includes an axial cable member 11 embedded therein, and the surface of the mandrel carries the desired thin coating of silicone 46. Onto this mandrel is built in conventional fashion a tube 54 of elastomeric material, such as by extrusion over mandrel 10, and then a reinforcement 56 is applied over the tube 54 with the mandrel serving to stabilize the shape of the tube during braiding, knitting or other twining operation whereby otherwise the reinforcement might cause neckdown of the tube. Once the reinforcement is applied, the customary cover 58 of elastomeric material is wrapped or extruded over the reinforcement. With plastic hose, all that remains to be done is to strip the mandrel 10 from the hose product, and this may be facilitated with high pressure water or the like, the mandrel readily being removable by virtue of the presence of the lubricant coat 46. In the case of rubber or other vulcanizable hose materials, the uncured hose element and mandrel are cured using heat and pressure in customary fashion to vulcanize the article. Again, upon vulcanization mandrel 10 is easily stripped from the tube of the hose.

The invention is capable of a variety of modifications and variations which will become apparent to those skilled in the art upon a reading of the present specification. The invention is intended to be limited only by the scope of the appended claims.

What is claimed is:

1. A method for lubricating flexible mandrel useful in the production of tubular articles such as hose, comprising:
   applying a coating of liquid lubricant substantially undiluted by solvent to the surface of the mandrel in excess of the thickness of coating finally desired;
   removing excess lubricant by impacting the coated mandrel with high pressure liquid spray jet directed angularly to the surface of the coated mandrel, while simultaneously
   moving the mandrel relative to the spray jet in a direction countercurrent thereto.

2. A method for treating the surface of a flexible elastomeric core, comprising:
   dipping the core in a liquid bath of lubricant oil substantially undiluted by solvent whereby a relatively thick coating of the lubricant oil adheres to the surface of the core;
   impacting the lubricant-coated core in a fluid spray zone with fluid jets directed angularly to the surface of the core, to reduce the thickness of the coating, while simultaneously
   moving the core relative to the fluid jets in a direction countercurrent thereto.

3. The method of claim 2 wherein said oil is substantially pure silicone.

4. The method of claim 2 wherein the lubricantcoated core is passed generally vertically and upwardly through the spray zone.

5. The method of claim 4 wherein the lubricantcoated core is impacted with liquid jets forming an angle $\theta$ of from about 30 to about 60 degress with the axis of the core.

6. A method for treating a solid elastomeric rod mandrel surface comprising:
   dipping the mandrel in a bath of silicone oil to form a silicone oil coating on the surface of the mandrel;
   passing the coated mandrel substantially vertically upwardly into a liquid spray zone; and
   impacting the surface of the coated mandrel with aqueous spray jets adjacently from the spray zone at a pressure of at least about 300 psi directed downwardly and at an angle from about 30 to about 60 degrees to the surface of the mandrel.

7. The method of claim 6 wherein the mandrel, after impacting with aqueous spray jets, is passed through a wiper bushing and then residual aqueous material is removed by gas jets substantially without disturbing the silicone coating on the mandrel.

8. Apparatus for applying lubricant of desired coating thickness to a flexible core, comprising:
   vessel means adapted to contain a supply of liquid lubricant;
   bushing means in the vessel for guiding the flexible core therethrough;
   nozzle means adjacent the bushing for directing high pressure liquid spray jet angularly against the flexible core coated with the liquid lubricant; and
   means for moving the core through the liquid lubricant and thereafter through the bushing in a direction countercurrent to the spray jet.

* * * * *